United States Patent [19]

Waters

[11] 4,368,987

[45] Jan. 18, 1983

[54] CONJUGATE-PHASE, REMOTE-CLOCK SYNCHRONIZER

[75] Inventor: William M. Waters, Millersville, Md.

[73] Assignee: The United States of America as represented by the Secretary of the Navy, Washington, D.C.

[21] Appl. No.: 163,001

[22] Filed: Jun. 25, 1980

[51] Int. Cl.[3] .......................... G04C 11/00; H04J 3/06

[52] U.S. Cl. ...................................... 368/46; 375/107

[58] Field of Search ...................... 368/46, 47, 49, 51; 73/6; 375/107, 118

[56] References Cited

U.S. PATENT DOCUMENTS

| | | | |
|---|---|---|---|
| 1,310,786 | 7/1919 | Bryce | 368/56 |
| 2,651,169 | 9/1953 | Barrows | 58/34 |
| 3,564,284 | 2/1971 | Kamens | 307/232 |
| 3,722,258 | 3/1978 | Besson et al. | 73/6 |
| 3,789,653 | 2/1974 | Brejaud | 73/6 |
| 3,896,378 | 7/1975 | Bedford | 324/188 |
| 4,142,069 | 2/1979 | Stover | 357/107 X |

OTHER PUBLICATIONS

"Satellite VHF Transponder Time Synchronization", Jesperson et al, Proc. IEEE, vol. 56, 7/68.

"Oscillator Synchronization Via Satellite", Wood et al, Radio Science, vol. 4, #10, pp. 1249-1252.

*Primary Examiner*—Vit W. Miska

*Attorney, Agent, or Firm*—Robert F. Beers; William T. Ellis; Philip Schneider

[57] ABSTRACT

A method for synchronizing a master clock and a remote slave clock which nominally has the same pulse frequency but may be out of time-phase comprising transmitting a master pulse to the slave, measuring the time delay, $\Delta\tau$, between the received pulse and the nearest succeeding (in time) slave pulse, delaying the latter slave pulse by $\Delta\tau$ to provide a conjugate slave pulse, transmitting the conjugate pulse to the master station and measuring the time difference $\Delta$ between time of reception of the conjugate pulse and time of generation of the original master pulse. The time $\Delta$ is equal to twice the error between the master and slave pulses. The process can also be done at the slave station if the slave pulse is transmitted to the master and a conjugate-phase master pulse is retransmitted to the slave where the measurement is accomplished. The phase of the slave pulse can then be adjusted by $\Delta/2$ to synchronize it with the master pulse.

12 Claims, 2 Drawing Figures

CONJUGATE-PHASE, REMOTE-CLOCK SYNCHRONIZER

BACKGROUND OF THE INVENTION

This invention relates to remote synchronization of clocks and especially to the synchronization of widely spaced clocks connected by a two-way communication link.

A current method used to synchronize clocks at substantial distances from a master clock is to literally transport a stable clock from the master to the slave in a time so short that the drift of the transported clock is small and then to compare the time of the slave with that of the transported clock. This method presents obvious difficulties when the distance between the clocks is greater than minimal and also requires an additional clock.

Another method depends only upon a reciprocal, time-invariant (within the propagation interval), two-way communication link. This is advantageous where a slave clock must be set quickly and often. A knowledge of the propagation time between master and slave is not required, although the time must remain constant. A system of this type for synchronizing a VHF satellite transponder has been described in an article "Satellite VHF Transponder Time Synchronization" by Jespersen, Kamas, Gatterer and MacDoran, in Proc. IEEE, Vol. 56, No. 7, pp. 1202-1206, July 1968. In the Jespersen et al. method, a voice communication link was maintained between master and slave station. The operator at the slave station merely told the master-station operator to advance or retard the master clock until its tick (pulse) coincided with that of the slave clock.

SUMMARY OF THE INVENTION

An object of the present invention is to eliminate the need for communication between operators of the master and slave stations in order to synchronize the master and slave clocks.

A further object is to enable the operator at one station to synchronize a master clock with one or more slave clocks, or vice versa.

A further object is to eliminate the propagation of the clock signals from consideration in synchronizing the clocks.

These and other objects of the invention are achieved by sending a pulse from a master-clock station to a slave station where a slave pulse having conjugate phase with respect to the received master pulse is retransmitted to the master station. A measurement of the time difference between the pulse received at the master and the original master pulse is used to calculate the error in time-phase between the slave and master pulses.

Other objects, advantages and novel features of the invention will become apparent from the following detailed description of the invention when considered in conjunction with the accompanying drawings wherein:

DETAILED DESCRIPTION OF THE INVENTION

Figure 1:
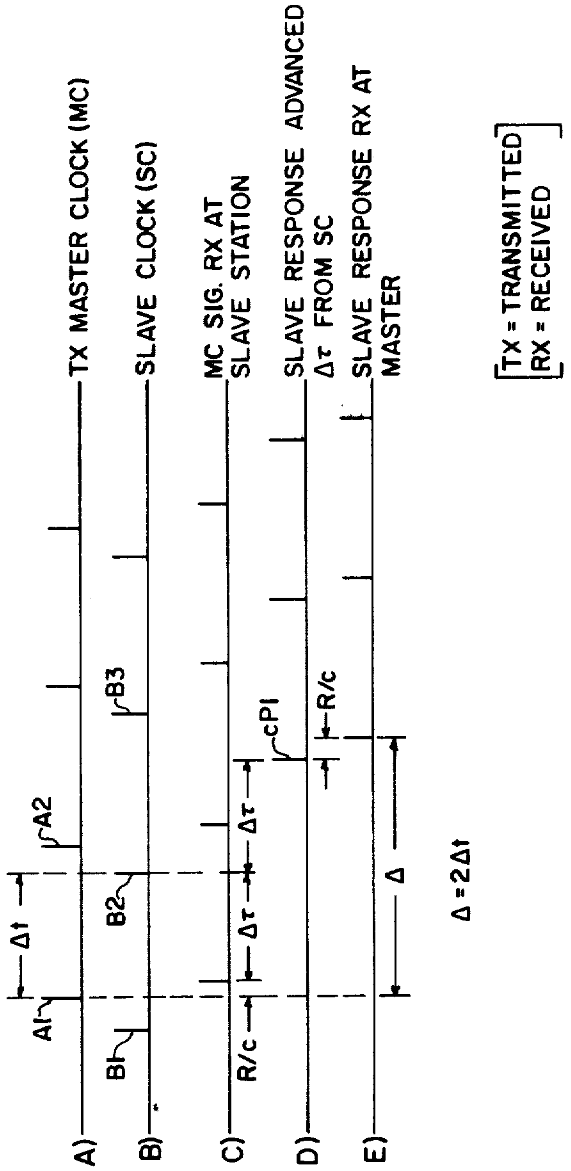
FIG. 1 is a diagram showing the master and slave clock signals and certain relationships therebetween in the case where the error in synchronization is measured at the master station.

FIG. 1 illustrates case (a) which is measurement of the time difference between spaced master clock and slave clock at the master station. Master and slave clock signals (ticks) are shown on lines A and B. These signals are two pulse trains of equal frequency and different time phase, the difference in time between each master and the immediately adjacent (in time) slave pulse being $\Delta t$. (Thus, pulses A1 and B2 are immediately adjacent pulses). This figure illustrates the case where a master pulse is transmitted to the slave station and the slave transmits its clock pulse to the master station, the synchronization being done at the latter. A knowledge, or measurement, of $\Delta t$, is necessary at the master station to accomplish synchronization. For simplicity, only one slave station is considered altho a plurality of slaves may be synchronized.

Line (C) illustrates the master clock signal received at the slave station. The propagation time of the master clock signal is shown as the interval R/C, where R is the propagation distance between the stations and C is the velocity of propagation. (Circuit delays are omitted.)

At the slave station, the time, $\Delta\tau$, between the reception of the master signal and the succeeding slave signal B2 is measured. This can be done, for example, by a high-speed digital counter, or a standard analog time/-voltage conversion. The next slave signal B2 is delayed (see line D) in transmission by the time $\Delta\tau$, i.e., the time-phase of the slave pulse is adjusted by the same amount as the amount of phase difference between the received master signal and the next slave pulse B2. Thus, the signals received by and transmitted by the slave station can be called phase-conjugates.

By making the reply from the slave station the phase-conjugate of the signal received from the master station, the desired measurement of $\Delta t$ can be made at the master station in terms of $\Delta$, the time interval between reception of the slave signal at the master station after the propagation delay of R/C and the time of the master pulse A1 (see line E) with which the measurement sequence started.

From lines A, B and C, it is apparent that:

$$\Delta t = (\Delta\tau + R/C) \quad (1)$$

From lines D and E, it can be seen that:

$$\Delta = (2\Delta\tau + 2R/C) \quad (2)$$

Solving these two equations by substituting (1) and (2), we find that:

$$\Delta t = \Delta/2 \quad (3)$$

It should be noted that slave clock pulse B2 can be delayed to form the conjugate-phase pulse CP1 or, alternatively, slave clock pulse B3 could be advanced once the desired time-position of the conjugate slave pulse is determined. However, the preferred method is to delay slave pulse B2 from which $\Delta\tau$ is measured.

Thus, by a measurement at the master station of the time, $\Delta$, between the time of reception of the conjugate slave clock pulse and the generation of the master clock clock pulse which started the measurement sequence (this pulse, A1, can be designated hereinafter as the "originator pulse"), the time $\Delta t$ between generation of the originator and generation of the next clock pulse at the slave station can be determined. Hence, the master station may compute the reading of the clock at the slave station by subtracting $\Delta t$(i.e., $\Delta/2$) from the master clock reading and a synchronization of the clocks can be effected.

It is, of course, apparent that the propagation times between master and slave and from slave to master must be substantially equal with respect to the time duration between a pulse at either station and the next pulse in the train. Another way of phrasing this is that this method requires that the communication link between master and slave stations be reciprocal and time-invariant within the propagation interval.

Case (b) is the case where the time difference measurement is made at the remote slave station (or stations). The clock information from multiple slaves may be obtained at the master station (M) through separate channels or through time-sharing. Each slave station (S) may be assigned a separate time to respond. Since clock stabilities of the part in $10^9$ are not uncommon, up-date intervals of two hours are adequate to maintain clock errors of less than 10.0 μsecs. Thus, the method can be used to unambiguously measure $\Delta t$ of a 50 KHz clock by transmitting and receiving a pulse every two hours. It follows by inspection of FIG. 1 that $3600\times 10^6/20=1.8\times 10^8$ stations could be synchronized on a 2-hour up-date interval. In practice, several pulses per station would probably be used to measure $\Delta t$ for fewer stations at more frequent intervals.

Figure 2:
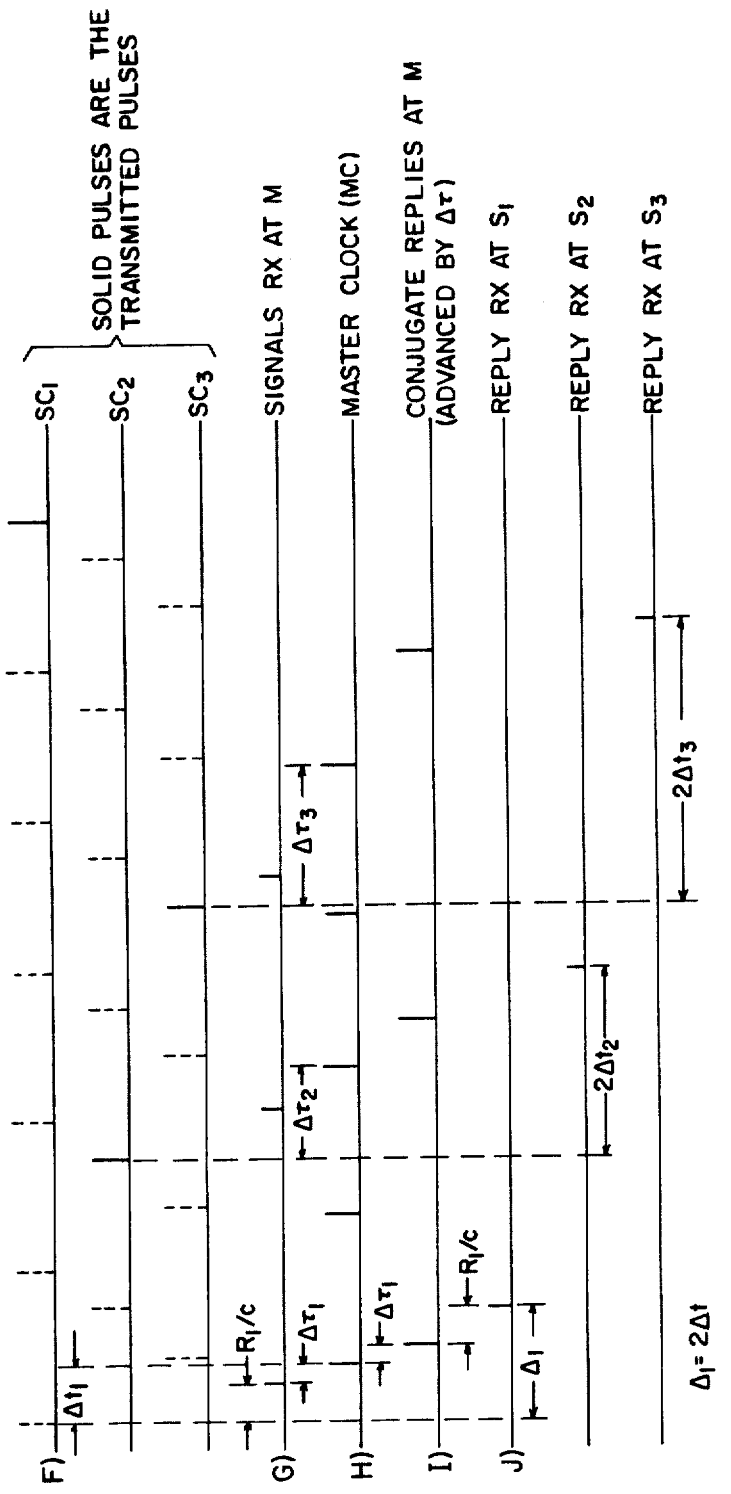
FIG. 2 is a diagram showing the master and slave clock signals and relationships in the case where the error synchronization is measured at the slave stations.

FIG. 2 illustrates a method for synchronizing the clocks which is particularly useful in the case where more than one slave clock is being synchronized. Looking only at one slave (SC1) and the master clock waveforms, the first slave clock pulse (SC1) is shown on line (F). Line (G) shows this pulse received (RX) at the master station with the propagation delay of $R_1/C$. The time between the start of SC1, the clock pulse (originator pulse) at the slave station 1 and the time of the succeeding master clock pulse at the master station is $\Delta t_1$. The time between reception of the slave pulse at the master station and the start of the immediately subsequent master clock pulse is $\Delta\tau_1$, shown on line H). The master clock pulse is then delayed by the time $\Delta\tau_1$, so that it is the phase-conjugate of the received slave pulse, SC1, and this conjugate pulse is transmitted. When received at the slave station 1, the conjugate pulse has a further delay, the propagation delay $R_1/C$, as shown on line (J). The time between the generation of the originator slave pulse (line F) and the reception of the conjugate-phase pulse at slave station 1 is called $\Delta_1$. In this case:

$$\Delta t_i=(Ri/C+\Delta\tau_i) \quad (4)$$

$$\Delta_i=2(Ri/C+\Delta\tau_i) \quad (5)$$

and, solving these equations $$\Delta t_i=\Delta_i/2 \quad (6)$$

(The symbol, or subscript, i, designates the number of the slave station being considered.)

In both cases (a) and (b) where time-sharing is employed, means must be provided to prevent errors due to time overlap. One clock synchronization is established, S stations would be assigned individual time slots, a method used in the Joint Tactical International Data System (JTIDS). On the other hand, in case (a), the master can use a discrete address code which silences all slaves except the addressee. In case (b), the master can respond with the same code received from a slave. Obvious alternatives involve separate frequency channels or even land-lines in many applications.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for determining the time reading of a remote-station clock at a first clock station, each station having a clock producing a train of clock pulses, both trains having substantially the same frequency but being different in time phase by an amount $\Delta t$, the method comprising the steps of:
transmitting a clock pulse, called the originator pulse, from the first station to start the timing sequence;
receiving at the remote station the originator pulse and utilizing the received pulse to form a conjugate-phase pulse from the remote-station clock;
transmitting the conjugate-phase pulse to the first station and receiving it there;
measuring at the first station the time difference $\Delta$ between the time of reception of the conjugate-phase pulse and the time of generation of the originator pulse; and
determining the difference in time phase $\Delta t$ between the time reading of the remote-station clock and the first-station clock according to the relationship $\Delta t=\Delta/2$.

2. A method as set forth in claim 1, wherein:
said conjugate-phase pulse is produced by measuring the time, $\Delta\tau$, between time of reception of the originator pulse and time of generation of the immediately succeeding remote-station pulse and then adjusting the time of transmission of said immediately succeeding remote-station pulse so that transmission occurs at its time of generation plus $\Delta\tau$.

3. A method as set forth in claim 1, including the additional step of:
synchronizing the first-station clock with the remote-station clock by adjusting the time of generation of first-station clock pulses by an amount equal to $\Delta t$.

4. A method as set forth in claim 1, including the additional step of:
synchronizing the first-station clock with the remote-station clock by delaying the remote station clock by an amount equal to $\Delta t$.

5. The methods of claims 1 or 2 including the further step of:
synchronizing the clocks at the two stations by adjusting the time phase of the clock at the first-clock station by the value of $\Delta/2$.

6. A method for determining at a first-clock station the time reading of the clock at a remote second-clock station, the first and second clocks each transmitting a train of spaced pulses, the trains having substantially the same frequency but different time phases by an amount $\Delta t$, the method comprising:
transmitting a first clock pulse from the first station;
receiving the transmitted first-clock pulse at the second-clock station;

measuring at the second station the time duration, $\Delta\tau$, between reception of the first-clock pulse and generation of the immediately succeeding second-clock pulse;

generating a phase conjugate of the received first-clock pulse from the second clock;

transmitting the conjugate pulse;

receiving the conjugate pulse at the first-clock station;

measuring at the first-clock station the time, $\Delta$, between reception of the conjugate pulse and generation of the immediately first-clock pulse which started the measurement sequence; and determining the time reading of the second-clock by correcting the time reading of the first clock by the value of $\Delta/2=\Delta t$.

7. A method for determining the time reading of a remote-station clock at a first clock station, each station having a clock producing a train of clock pulses, both trains having substantially the same frequency but being different in time phase by an amount $\Delta t$, the method comprising the steps of:

transmitting a first-clock pulse from the first-clock station;

receiving the transmitted first-clock pulse at the second-clock station;

measuring at the second-clock station the time delay, $\Delta\tau$, between reception of the first-clock pulse and generation of the immediately succeeding second-clock pulse;

delaying the time of the next second-clock pulse by an amount equal to the measured time, $\Delta\tau$;

transmitting the time-delayed second-clock pulse;

receiving the transmitted time-delayed pulse at the first-clock station;

measuring at the first-clock station the time, $\Delta$, between reception of the time-delayed pulse and generation of the first-clock pulse which started the measurement sequence; and determining at the first-clock station the time reading of the clock at the second-clock station by adding the time, $(\Delta/2)=\Delta t$, to the reading of the clock at the first-clock station.

8. A method for determining at a master clock station the time reading of the slave clock at a remote slave clock station, the master and slave clocks each transmitting a train of spaced pulses, the trains having substantially the same frequency but different time phases, $\Delta t_i$, the method comprising the steps of:

transmitting a master clock pulse from the master station;

receiving the master pulse at a slave station;

measuring at the slave station the time duration, $\Delta\tau$, between reception of the master pulse and generation of the immediately succeeding slave clock pulse;

delaying said immediately succeeding a slave clock pulse to form the phase conjugate of the received master pulse;

transmitting the conjugate slave pulse;

receiving the conjugate slave pulse at the master station;

measuring at the master station the time, $\Delta$, between reception of the conjugate slave pulse and the generation of the master clock pulse which originated the measuring sequence; and determining the time reading of the slave clock by correcting the time reading of the master clock pulse by the value of $\Delta/2=\Delta t$.

9. A method for determining at a master clock station the time reading of the slave clock at a remote slave station, the master and slave clocks each transmitting a train of spaced pulses, the trains having substantially the same frequency but different time phases, $\Delta t_i$, the method comprising the steps of:

transmitting a master clock pulse from the master station;

receiving the transmitted master clock pulse at the slave station;

measuring at the slave station the time delay, $\Delta\tau$, between reception of the master clock pulse and generation of the immediately succeeding slave clock pulse;

delaying said immediately succeeding slave clock pulse by an amount equal to the measured time, $\Delta\tau$;

transmitting the time-delayed slave clock pulse;

receiving the transmitted delayed slave clock pulse at the master station;

measuring at the master station the time, $\Delta$, between reception of the slave clock pulse and generation of the master clock pulse which originated the measuring sequence; and determining at the master station the time reading of the slave clock by adding the time, $\Delta/2=\Delta t$, to the master clock reading.

10. A method for determining the time reading of a remote-station clock at a first clock station, each station having a clock producing a train of clock pulses, both training having substantially the same frequency but being different in time phase by an amount $\Delta t$, the method comprising the steps of:

transmitting a clock pulse, called the originator pulse, from the first station to start the timing sequence;

receiving at the remote station the originator pulse and utilizing the received pulse to form a conjugate-phase pulse from the remote-station clock, said conjugate-phase pulse being produced by measuring the time, $\Delta\tau$, between the time of reception of the originator pulse and the time of generation of the immediately succeeding remote-station pulse and then adjusting the time of transmission of said immediately succeeding remote-station pulse so that the transmission occurs at its time of generation plus $\Delta\tau$;

transmitting the conjugate-phase pulse to the first station and receiving it there; and measuring at the first station the time difference $\Delta$ between the time of reception of the conjugate-phase pulse and the time of generation of the originator pulse, the time reading of the remote-station clock being different from that of the first-station clock by an amount equal to $\Delta/2$.

11. A method as set forth in claim 10, including the additional step of:

synchronizing the first-station clock with the remote-station clock by adjusting the time of generation of first-station clock pulses by an amount equal to $\Delta/2$.

12. A method as set forth in claim 10, including the additional step of:

synchronizing the first-station clock with the remote-station clock by delaying the remote station clock by an amount equal to $\Delta/2$.

* * * * *